(12) United States Patent
Schwesinger et al.

(10) Patent No.: US 9,423,939 B2
(45) Date of Patent: Aug. 23, 2016

(54) DYNAMIC ADJUSTMENT OF USER INTERFACE

(71) Applicant: MICROSOFT TECHNOLOGY LICENSING, LLC, Redmond, WA (US)

(72) Inventors: Mark Schwesinger, Bellevue, WA (US); Oscar Murillo, Redmond, WA (US); Emily Yang, Seattle, WA (US); Richard Bailey, Seattle, WA (US); Jay Kapur, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 259 days.

(21) Appl. No.: 13/674,793

(22) Filed: Nov. 12, 2012

(65) Prior Publication Data

US 2014/0132499 A1     May 15, 2014

(51) Int. Cl.
*G06F 3/0484*     (2013.01)
*G06F 3/01*     (2006.01)
*G06F 3/03*     (2006.01)
*A63F 13/20*     (2014.01)

(52) U.S. Cl.
CPC .......... *G06F 3/04845* (2013.01); *A63F 13/06* (2013.01); *G06F 3/011* (2013.01); *G06F 3/017* (2013.01); *G06F 3/0304* (2013.01); *G06F 3/0484* (2013.01); *A63F 2300/1087* (2013.01); *A63F 2300/308* (2013.01); *G06F 2203/04806* (2013.01)

(58) Field of Classification Search
CPC . G06F 3/0482; G06F 3/0484; G06F 3/04842; G06F 3/0488; G06F 3/01; G06F 3/048; G06F 3/04883; G06F 3/017; G06F 3/0481; G06F 3/04; G06T 5/003; G06T 5/50; H04N 21/4126; H04N 21/42224; H04N 21/4858; H04N 5/23216; H04N 5/2628
See application file for complete search history.

(56) References Cited

U.S. PATENT DOCUMENTS

| | | | |
|---|---|---|---|
| 2006/0161871 A1* | 7/2006 | Hotelling et al. | 715/863 |
| 2007/0279591 A1 | 12/2007 | Wezowski et al. | |
| 2008/0030460 A1* | 2/2008 | Hildreth et al. | 345/156 |
| 2009/0076766 A1 | 3/2009 | Fein et al. | |
| 2009/0313584 A1* | 12/2009 | Kerr et al. | 715/849 |
| 2010/0079370 A1 | 4/2010 | Kim et al. | |
| 2010/0185969 A1 | 7/2010 | Wendt et al. | |
| 2010/0251171 A1 | 9/2010 | Parulski | |

(Continued)

OTHER PUBLICATIONS

ISA European Patent Office, International Search Report & Written Opinion for Patent Application No. PCT/US2013/069615, Feb. 13, 2014, 11 Pages.

(Continued)

*Primary Examiner* — Jeffrey A Gaffin
*Assistant Examiner* — Mandrita Brahmachari
(74) *Attorney, Agent, or Firm* — Aaron Chatterjee; Judy Yee; Micky Minhas

(57) ABSTRACT

Embodiments related to dynamically adjusting a user interface based upon depth information are disclosed. For example, one disclosed embodiment provides a method including receiving depth information of a physical space from a depth camera, locating a user within the physical space from the depth information, determining a distance between the user and a display device from the depth information, and adjusting one or more features of a user interface displayed on the display device based on the distance.

19 Claims, 5 Drawing Sheets

(56) References Cited

U.S. PATENT DOCUMENTS

| | | |
|---|---|---|
| 2011/0118032 A1 | 5/2011 | Zalewski |
| 2011/0148930 A1* | 6/2011 | Lee et al. .................. 345/660 |
| 2011/0193939 A1* | 8/2011 | Vassigh et al. .............. 348/46 |
| 2011/0234492 A1* | 9/2011 | Ajmera et al. ............. 345/158 |
| 2011/0254846 A1* | 10/2011 | Lee et al. .................. 345/427 |
| 2011/0298722 A1 | 12/2011 | Tse et al. |
| 2012/0050154 A1 | 3/2012 | Jagmag |
| 2012/0127281 A1 | 5/2012 | Ward et al. |
| 2012/0169620 A1 | 7/2012 | Bowler, II |
| 2012/0287163 A1* | 11/2012 | Djavaherian .............. 345/667 |
| 2013/0002577 A1* | 1/2013 | Kim .......................... 345/173 |
| 2013/0038564 A1* | 2/2013 | Ho ............................ 345/174 |
| 2013/0176236 A1* | 7/2013 | Ivanov ...................... 345/173 |

OTHER PUBLICATIONS

Gallo, et al., "Controller-Free Exploration of Medical Image Data: Experiencing the Kinect", Retrieved at <<http://ieeexplore.ieee.org/stamp/stamp.jsp?tp=&arnumber=5999138>>, International Symposium on Computer Based Medical Systems, Jun. 27, 2011, pp. 6.

* cited by examiner

DYNAMIC ADJUSTMENT OF USER INTERFACE

BACKGROUND

User interfaces for computers, mobile phones, gaming devices, etc., are sized to allow a user to visualize and interact with the interface from an expected distance and/or via an expected input mechanism. For example, a user interface configured for display on a computer monitor may be designed for use with a relatively large screen and a precise user input device, such as a mouse or the like. As a result, such a user interface may have a relatively large number of controls spaced relatively close together. In contrast, a user interface designed for a smart phone may be designed for use with a smaller screen and touch inputs. As a result, such a user interface may have a relatively small number of controls with wider spacing. Such user interfaces may have zoom controls that allow a user to choose to increase or decrease a magnification of the user interface as displayed.

SUMMARY

Embodiments related to dynamically adjusting a user interface based upon depth information are disclosed. For example, one disclosed embodiment provides, on a computing device, a method including receiving depth information of a physical space from a depth camera, locating a user within the physical space from the depth information, determining a distance between the user and a display device from the depth information, and adjusting one or more features of a user interface displayed on the display device based on the distance.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, user interfaces may be designed for particular use scenarios. For example, in the case of a user interface designed for display on a computer monitor, it may be assumed that a user will view the user interface from a relatively close distance, and utilize a relatively precise input mechanism. These assumptions may be accurate in most cases, as the user is unlikely to move away from the display device and/or input mechanism when interacting with the user interface.

However, in the case of a user interface configured to be controlled by user gestures and/or voice commands, a user may be positioned across a much wider range of distances when interacting with the user interface. When the user is at greater distances from the display device, the user may have difficulty viewing and/or selecting user interface features designed for shorter-distance use. Likewise, when the user is at lesser distances, a user interface designed for greater distances may have unnecessarily large and/or widely spaced controls.

Accordingly, embodiments are disclosed that relate to dynamically adapting a user interface based upon a user's distance from the user interface. Briefly, a sensor such as a depth camera may be used to determine a distance between the user and the display device. Then, based on this distance and/or changes in this distance, one or more aspects of a displayed user interface may be adjusted. For example, a size and/or number of features in the user interface may be increased or decreased based upon changes in the user's distance from the user interface. This may help to maintain a desired level of readability and ease of interactivity for the user interface as a user moves within the use environment.

Figure 1:
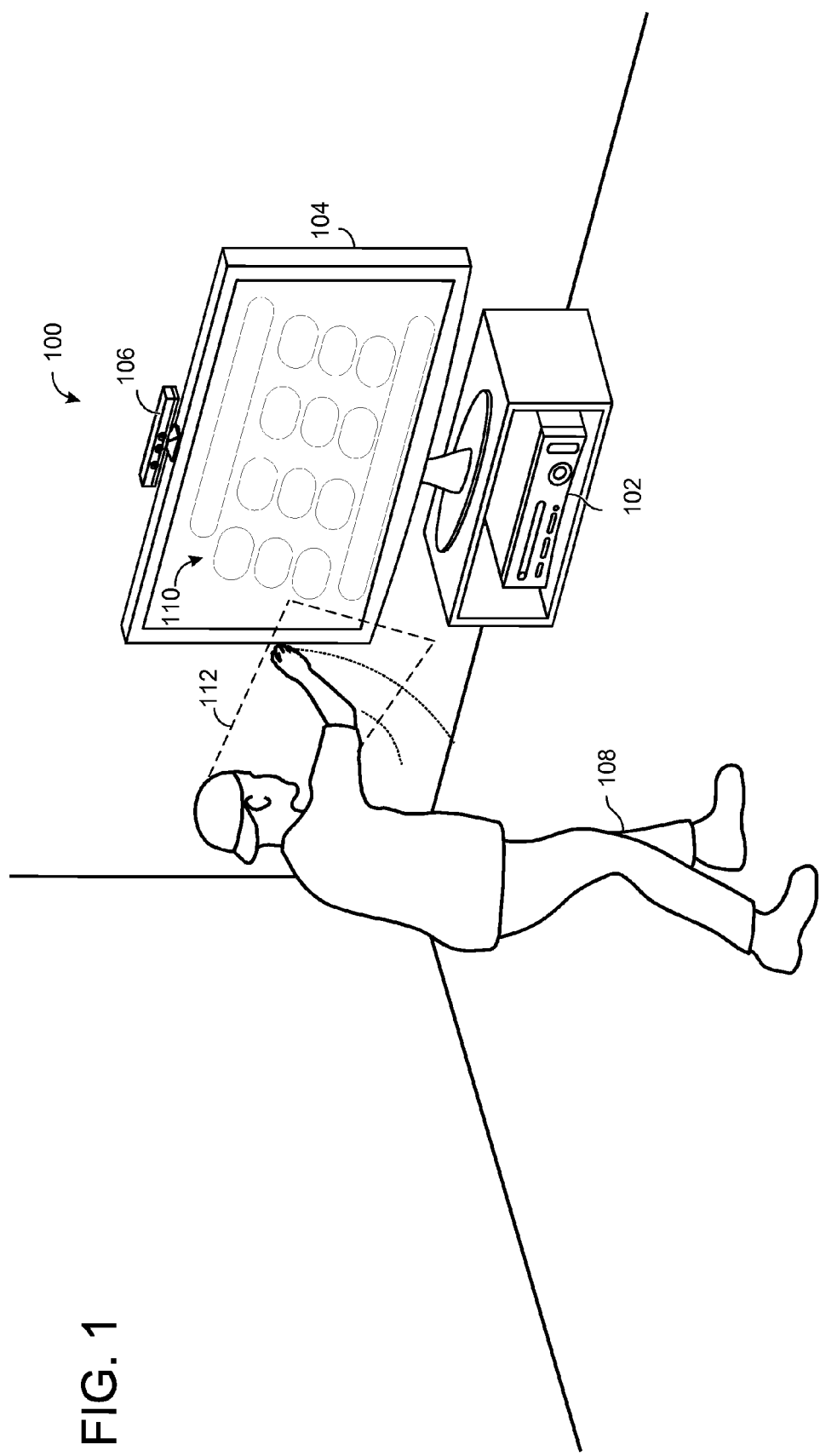
FIG. 1 shows a schematic illustration of an example embodiment of a user interface, and a user positioned at a first distance from the user interface.

FIG. 1 shows a non-limiting example of a use environment 100. In particular, FIG. 1 shows an entertainment system 102 that may be used to play a variety of different games, play one or more different media types, and/or control or manipulate non-game applications and/or operating systems. FIG. 1 also shows a display device 104 such as a television or a computer monitor, which may be used to present media content, game visuals, etc., to users. As one example, display device 104 may be used to visually present a user interface 110 for entertainment system 102. The user interface environment 100 may include a capture device 106, such as a depth camera that visually monitors or tracks objects and users within an observed scene.

Display device 104 may be operatively connected to entertainment system 102 via a display output of the entertainment system. For example, entertainment system 102 may include an HDMI or other suitable wired or wireless display output. Display device 104 may receive video content from entertainment system 102, and/or it may include a separate receiver configured to receive video content directly from a content provider. Additionally, display device 104 may display the user interface 110 received from entertainment system 102. The user interface 110 may present video content (including gaming and non-gaming video content), menus, control options, or other suitable content to user 108. The user interface 110 displayed on display device 104 may include multiple features, such as images, text, control buttons, etc. User 108 may enter input via user interface 110, for example by selecting one of the displayed features by touching display device 104, performing a specific gesture, issuing a voice command, etc.

The capture device 106 may be operatively connected to the entertainment system 102 via one or more interfaces. As a non-limiting example, the entertainment system 102 may include a universal serial bus to which the capture device 106 may be connected. Capture device 106 may be used to recognize, analyze, and/or track one or more human subjects and/or objects within a physical space, such as user 108. In one non-limiting example, capture device 106 may include an infrared light to project infrared light onto the physical space and a depth camera configured to receive infrared light.

In order to image objects within the physical space, the infrared light may emit infrared light that is reflected off objects in the physical space and received by the depth camera. Based on the received infrared light, a depth map of the physical space may be compiled. Capture device 106 may output the depth map derived from the infrared light to entertainment system 102, where it may be used to create a representation of the physical space imaged by the depth camera. The capture device may also be used to recognize objects in the physical space, monitor movement of one or more users, perform gesture recognition, etc. For example, a distance between user 108 and display device 104 may be determined based on information received from the capture device. Virtually any depth finding technology may be used without departing from the scope of this disclosure. Example depth finding technologies are discussed in more detail with reference to FIG. 5.

Entertainment system 102 may be configured to communicate with one or more remote computing devices, not shown in FIG. 1. For example, entertainment system 102 may receive video content directly from a broadcaster, third party media delivery service, or other content provider. Entertainment system 102 may also communicate with one or more remote services via the Internet or another network, for example in order to analyze depth information received from capture device 106.

While the embodiment depicted in FIG. 1 shows entertainment system 102, display device 104, and capture device 106 as separate elements, in some embodiments one or more of the elements may be integrated into a common device. For example, entertainment system 102 and capture device 106 may be integrated in a common device.

FIG. 1 also shows a scenario in which capture device 106 tracks user 108 so that the movements of the user may be interpreted by entertainment system 102. In particular, capture device 106 may track user 108 so that entertainment system 102 may locate user 108 within the physical space imaged by the capture device. Once located, data from capture device 106 may be used to determine a distance between user 108 and display device 104.

Entertainment system 102 may adjust the number and/or size of features displayed in user interface 110 based on the determined distance of the user. For example, as depicted in FIG. 1, user 108 may be located at a first, relatively shorter distance from display device 104. As a result, user 108 may be able to visualize a large number of small-sized features. Thus, user interface 110 is shown displaying a first, larger number of features having a smaller relative size. Such a user interface may be configured for relatively more precise input mechanisms, such as gestures performed at close distances and/or touch inputs performed on display device 104.

For gesture-based inputs, entertainment system 102 may receive data from capture device 106 and identify one or more movements of user 108 from the received data. While entertainment system 102 may receive image (e.g., depth) data for the entire physical space within the field of view of capture device 106, only a particular region of the imaged physical space may be analyzed to determine input control gestures performed by user 108. By restricting the analysis to a defined zone rather than the entire physical space, the accuracy of identified gestures may be increased. This defined zone may be referred to as a user input zone 112, which is a zone of physical interaction between the user and the display device as monitored via data from the capture device 106.

User input zone 112 may also be adjusted based on the distance between user 108 and display device 104 (or the distance between user 108 and capture device 106). For example, the user input zone may be scaled down and focused in front of the user as the user moves closer to the capture device. This may allow a user to make relatively finer motions to interact with the user interface, and to ensure that the entire user input zone is within the field of view of the capture device. It will be understood that the size of the user input zone may also be based on a size of the user, which may be determined by the depth information.

If user 108 moves away from display device 104, the user interface and/or user input zone may be adjusted. For example, as the user moves away from the display device, the closer-range user interface may become difficult to visualize. As such, the size of displayed features may be increased and/or the number of displayed features may be decreased. Further, the user input zone size may be increased as the amount of space around the user imaged by capture device increases.

Figure 2:
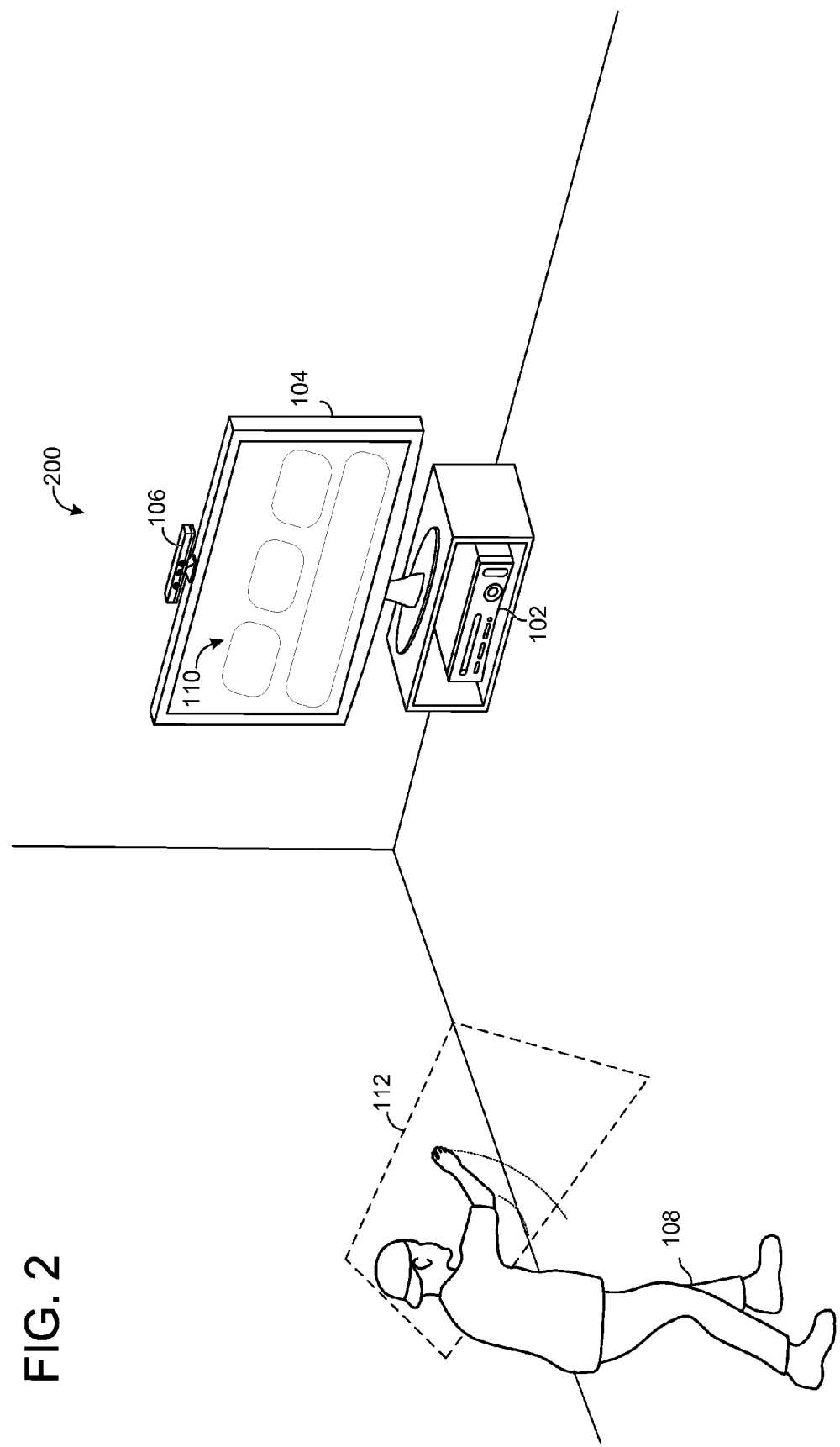
FIG. 2 shows the user at a second distance from the user interface of FIG. 1.

FIG. 2 illustrates user 108 at a second, greater distance from display device 104. Based on the increased distance between user 108 and display device 104, user interface 110 may be adjusted to display fewer features of a larger size and/or spacing, as a user may have more difficulty selecting smaller elements at a greater distance. Additionally, the size of user input zone 112 may be increased, as described above. This may allow more precise gesture control by allowing for larger user gesture movements relative to a movement of a cursor or other selection control on the display.

In addition to tracking the distance between the user and the display device and adjusting the user interface accordingly, the direction the user is facing may also be tracked, and the user interface may be adjusted based on a direction the user is facing. For example, if the user turns away from the display device, the user interface may be adjusted to display larger content that may be more useful from the angle at which the user is now viewing the display device. In another example, less personal information may be displayed when the user turns away from the display device, such that the user may be interrupted by another user and turn to interact with the other user, yet feel comfortable that the previously-displayed information is now hidden from view.

As explained above, in order to track and interpret movements of user 108, depth data may be collected by the depth camera of capture device 106. As explained previously, capture device 106 may include one or more sensors that are configured to observe a human subject, such as user 108. For example, the capture device may include a depth camera, a visible light (e.g., color) camera, and a microphone.

Figure 3:
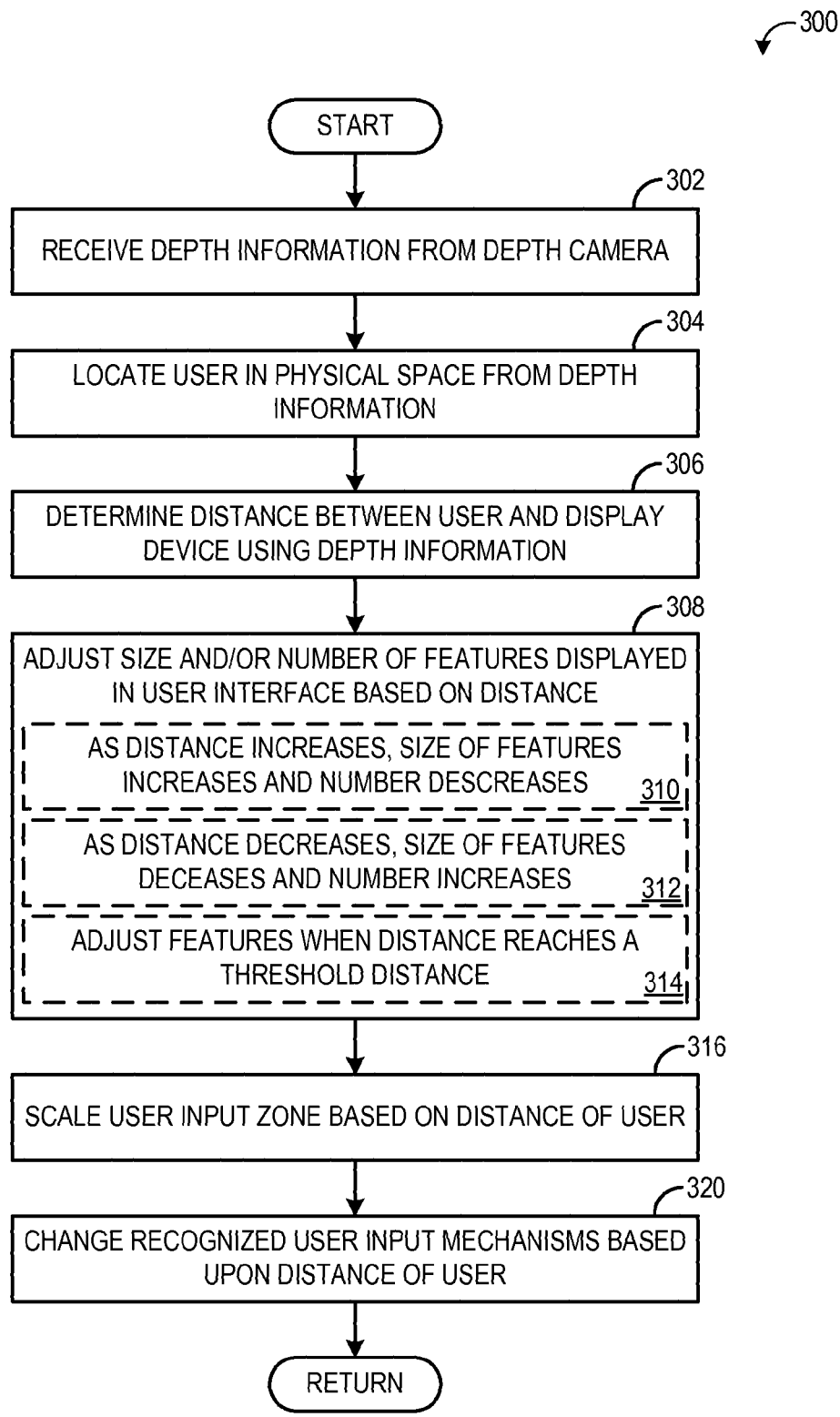
FIG. 3 is a flow chart illustrating a method for dynamically adjusting a user interface according to an embodiment of the present disclosure.

FIG. 3 shows a flow diagram depicting an embodiment of a method 300 for adjusting a user interface based on a distance of a user from the user interface. The user distance may be measured using depth data received by a depth camera, such as capture device 106, and/or in any other suitable manner.

At 302, depth information is received from a depth sensor, such as a depth camera. The depth information may be used to compile a depth map of the imaged physical space including a user. At 304, the user is located in the physical space from the depth information, and at 306, a distance between the user and the display device is determined using the depth information. The location of the display device also may be determined based on the depth information, depending upon a location of the capture device. In other embodiments, the location of the display device may be inferred. For example it may be assumed the display device and depth camera are in a similar location. The distance between the display device and the user may be determined based on any suitable part of the user. For example, the distance between the user's torso and the display device may be determined, the distance between the head of the user and the display device may be determined, etc.

At 308, method 300 includes adjusting a size and/or number of features of a user interface displayed on the display device based on the determined distance. As explained previously, the features of the user interface may include text, images, control input buttons, menus, and/or any other suitable features. As indicated at 310, as the distance between the user and the display device increases, the size of the displayed features may increase and/or the number of displayed features may decrease. Conversely, as indicated at 312, as the distance between the user and the display device decreases, the size of the displayed features may decrease and/or the number of displayed features may increase. In some embodiments, when the size and/or number of features of the user interface are adjusted, the features may be animated as they are adjusted in order to facilitate user understanding of what is changing during the adjustment of the interface.

Further, any other suitable user interface adjustments may be performed. For example, if the user is within touching distance of the display device, user input controls selectable by touch may be displayed. Likewise, if the user moves out of touching distance, display of the touch input controls may cease. In another example, certain features may be condensed or expanded as the user moves relative to the display device. For example, if the user is a relatively far distance from the display device, an email menu may be displayed that indicates the total number of unread emails in the user's email account. As the user moves closer to the display device, the email menu may be adjusted to display the subjects of all the unread emails. Virtually any mechanism of adjusting the features of the user interface based on the distance of the user from the display device is within the scope of this disclosure.

In some embodiments, as indicated at 314, the features of the user interface may be adjusted when the distance between the user and the display device reaches a threshold distance. In this way, the displayed features may remain of constant size, number, etc., as the user moves without crossing a threshold distance. However, upon crossing a threshold distance, the user interface may be adjusted. Adjusting the user interface at threshold distances may provide a smoother user interface display in some cases due to the interface not changing for at least a range of distances. In other embodiments, user interface features may be continually adjusted as the user moves. For example, if the user interface is displaying a map, the map may be continually rescaled as the user moves.

If the user is positioned near the threshold distance for adjusting the user interface, in some embodiments, some hysteresis may be provided at the threshold to avoid having small movements around the threshold trigger a change in the user interface. For example, upon crossing a threshold in one direction (thereby triggering an adjustment of the user interface), a different threshold may be used to readjust the user interface back to the original layout. This may help to avoid flickering of the user interface between views when a user is located near a distance threshold. Additional detail regarding user interface adjustment based on threshold distances will be presented below with respect to FIG. 4.

At 316, method 300 may further comprise scaling the user input zone based on the determined distance of the user from the user interface. For example, as described above, a size of a user input zone (e.g. a physical interaction zone monitored for gesture inputs) may increase as the distance between the user and the display device increases, and may decrease as the distance decreases. In some examples, a prompt may be displayed on the display device indicating to the user that his or her gestures are to change in size and/or scope as the user input zone changes. As with the appearance of the user interface, the user input zone may change at threshold distances, may vary continuously, or may vary in different manners in different distance ranges.

Figure 4:
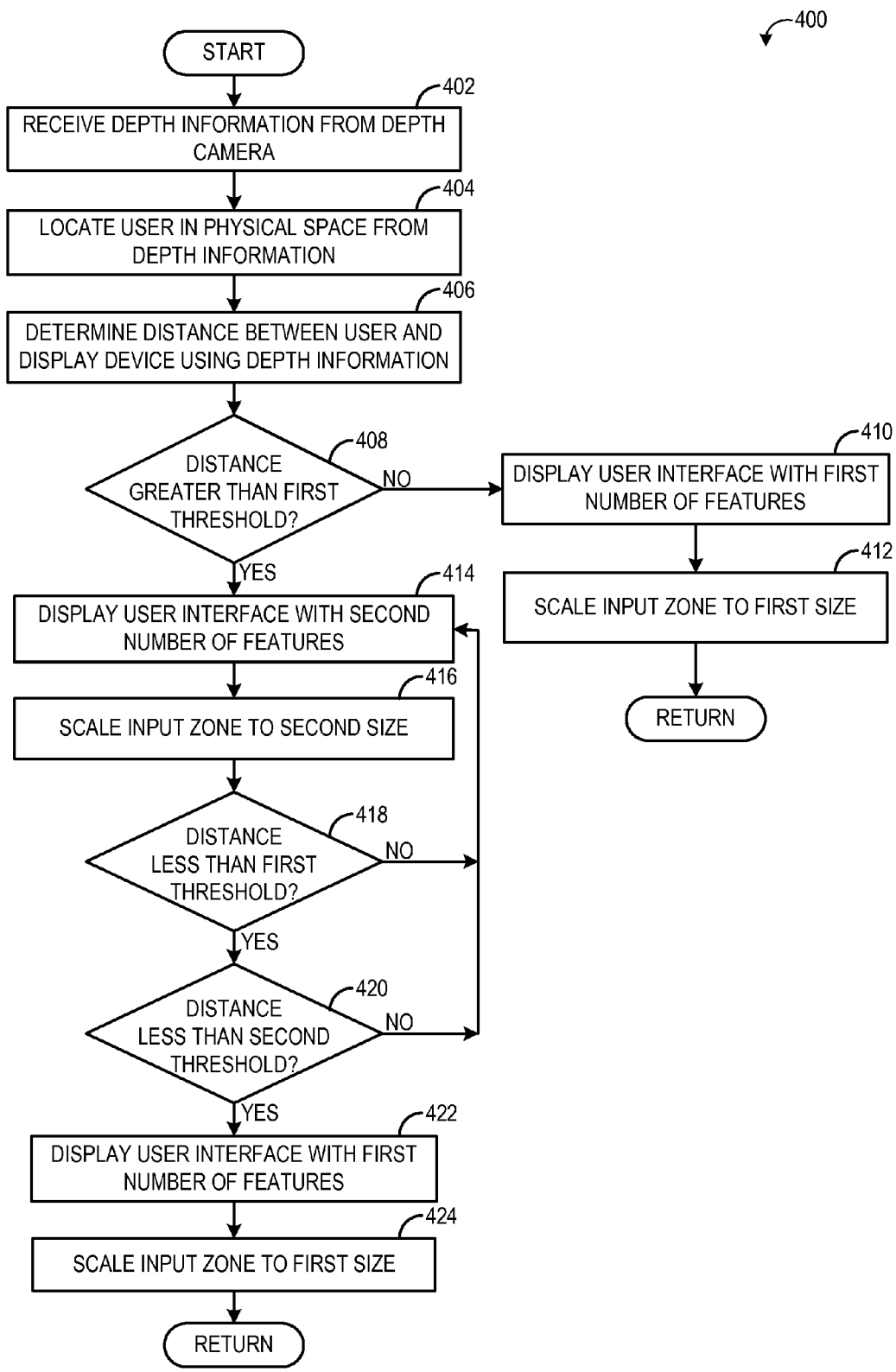
FIG. 4 is a flow chart illustrating a method for adjusting a user interface according to another embodiment of the present disclosure.

FIG. 4 illustrates a method 400 for adjusting a user input based on a distance of the user according to another embodiment of the present disclosure, and illustrates hysteresis when a user crosses a threshold distance in different directions.

At 402, depth information is received from a depth camera. As explained above, the depth information may be used to compile a depth map of the imaged physical space including a user. At 404, the user is located in the physical space from the depth information. At 406, the distance between the user and the display device is determined using the depth information. At 408, it is determined if the distance between the user and the display device is greater than a first threshold. The first threshold may be any suitable distance. For example, the first threshold may be a distance at which it is assumed that the user interface may become difficult for the user to clearly see, understand, and/or interact with.

If the user is not at a distance greater than the threshold, method 400 proceeds to 410 to display the user interface with a first number of features, and/or at 412, to scale the user input zone to a first size. On the other hand, if the user is at a distance greater than the threshold, method 400 comprises, at 414, displaying a user interface with a second, different number of features. This may additionally or alternatively comprise displaying features of different sizes and/or separations than for distances not greater than the first threshold. Further, method 400 may comprise, at 416, scaling the input zone to a second, different size.

As the user moves within the use environment, the user is monitored for changes in distance. Thus, at 418, method 400 comprises determining if the distance of the user is less than the first threshold. If the distance is not less than the first threshold, then method 400 continues to display the user interface with the second number of features.

On the other hand, if the distance is less than the first threshold, method 400 comprises, at 420, determining if the distance is less than a second threshold. For example, the second threshold may be near the first threshold, but may be a shorter distance (i.e. closer to the displayed user interface) than the first threshold. If the user is not at a distance less than the second threshold, method 400 continues to display the user interface with the second number of features. However, if the user is at a distance less than the second threshold, then method 400 comprises, at 422, displaying the user interface with the first number of features and, at 424, scaling the user input zone to the first size. This may help to avoid an unstable user interface appearance and/or user input zone size when in the vicinity of a distance threshold.

While only two zones (e.g., a first distance and a second distance) are described in the above examples, it is to be understood that the physical space imaged by the depth camera and occupied by the user may be divided into any number of zones, with each zone having a different user interface layout. Further, if the user moves completely out of the field of view of the depth camera, the user interface may be adjusted to display a power-saving interface, for example, or may be adjusted in any other suitable manner. In another example, if the user is close to the display device with his or her hands down, a non-interactive interface may be displayed. Then, if the user raises his or her arm, an interactive interface may be displayed.

In some embodiments, the methods and processes described above may be tied to a computing system of one or more computing devices. In particular, such methods and processes may be implemented as a computer-application program or service, an application-programming interface (API), a library, and/or other computer-program product.

Figure 5:
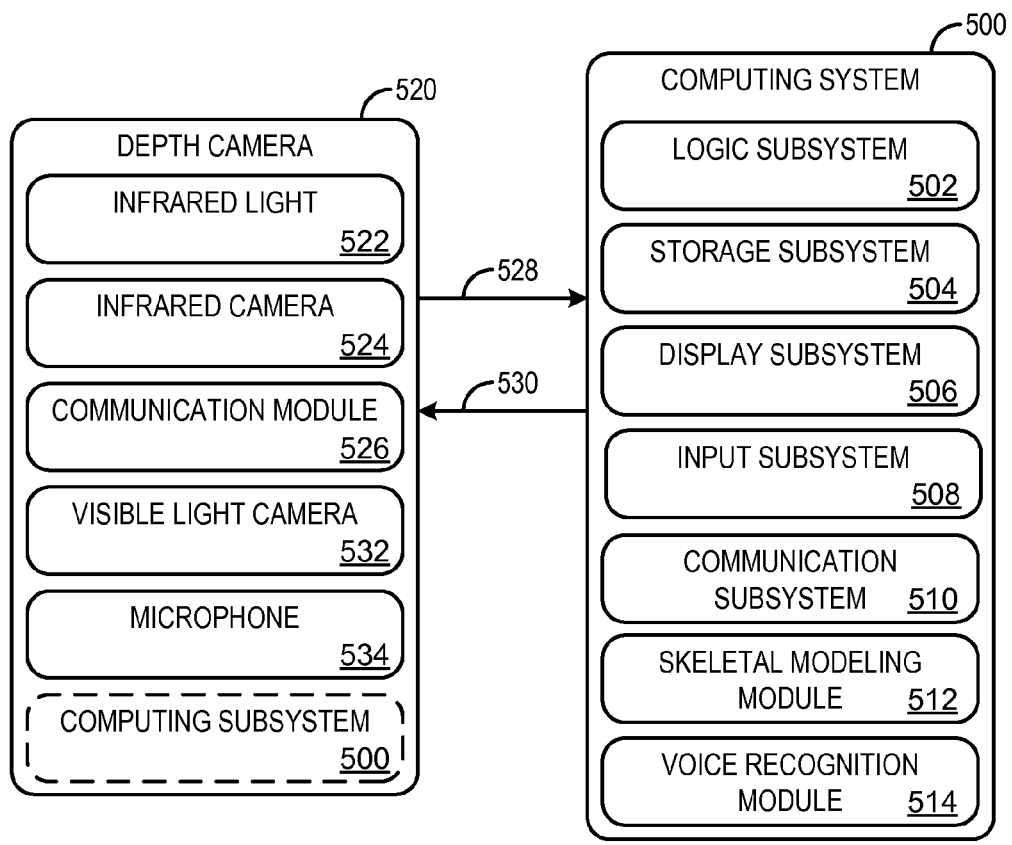
FIG. 5 schematically shows a non-limiting computing device.

FIG. 5 schematically shows a non-limiting embodiment of a computing system 500 that can enact one or more of the methods and processes described above. Computing system 500 is one non-limiting example of entertainment system 102. Computing system 500 is shown in simplified form. It will be understood that virtually any computer architecture may be used without departing from the scope of this disclosure. In different embodiments, computing system 500 may take the form of a mainframe computer, server computer, desktop computer, laptop computer, tablet computer, home-entertainment computer, network computing device, gaming device, mobile computing device, mobile communication device (e.g., smart phone), etc.

Computing system 500 includes a logic subsystem 502 and a storage subsystem 504. Computing system 500 may optionally include a display subsystem 506, input subsystem 508, communication subsystem 510, and/or other components not shown in FIG. 5.

Logic subsystem 502 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem may include one or more processors configured to execute software instructions. Additionally or alternatively, the logic subsystem may include one or more hardware or firmware logic machines configured to execute hardware or firmware instructions. The processors of the logic subsystem may be single-core or multi-core, and the programs executed thereon may be configured for sequential, parallel or distributed processing. The logic subsystem may optionally include individual components that are distributed among two or more devices, which can be remotely located and/or configured for coordinated processing. Aspects of the logic subsystem may be virtualized and executed by remotely accessible, networked computing devices configured in a cloud-computing configuration.

Storage subsystem 504 includes one or more physical, non-transitory, devices configured to hold data and/or instructions executable by the logic subsystem to implement the methods and processes described herein. When such methods and processes are implemented, the state of storage subsystem 504 may be transformed—e.g., to hold different data.

Storage subsystem 504 may include removable media and/or built-in devices. Storage subsystem 504 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others. Storage subsystem 504 may include volatile, nonvolatile, dynamic, static, read/write, read-only, random-access, sequential-access, location-addressable, file-addressable, and/or content-addressable devices.

It will be appreciated that storage subsystem 504 includes one or more physical, non-transitory devices. However, in some embodiments, aspects of the instructions described herein may be propagated in a transitory fashion by a pure signal (e.g., an electromagnetic signal, an optical signal, etc.) that is not held by a physical device for a finite duration.

Furthermore, data and/or other forms of information pertaining to the present disclosure may be propagated by a pure signal.

In some embodiments, aspects of logic subsystem 502 and of storage subsystem 504 may be integrated together into one or more hardware-logic components through which the functionally described herein may be enacted. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

The term "module" may be used to describe an aspect of computing system 500 implemented to perform a particular function. In some cases, a module may be instantiated via logic subsystem 502 executing instructions held by storage subsystem 504. It will be understood that different modules may be instantiated from the same application, service, code block, object, library, routine, API, function, etc. Likewise, the same module may be instantiated by different applications, services, code blocks, objects, routines, APIs, functions, etc. The term "module" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 506 may be used to present a visual representation of data held by storage subsystem 504. This visual representation may take the form of a graphical user interface (GUI). As the herein described methods and processes change the data held by the storage subsystem, and thus transform the state of the storage subsystem, the state of display subsystem 506 may likewise be transformed to visually represent changes in the underlying data. Display subsystem 506 may include one or more display devices utilizing virtually any type of technology. Such display devices may be combined with logic subsystem 502 and/or storage subsystem 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, steroscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

Further, computing system 500 may include a skeletal modeling module 512 configured to receive imaging information from a depth camera 520 (described below) and identify and/or interpret one or more postures and gestures performed by a user. Computing system 500 may also include a voice recognition module 514 to identify and/or interpret one or more voice commands issued by the user detected via a microphone (coupled to computing system 500 or the depth camera). While skeletal modeling module 512 and voice recognition module 514 are depicted as being integrated within computing system 500, in some embodiments, one or both of the modules may instead be included in the depth camera 520.

Computing system 500 may be operatively coupled to the depth camera 520. Depth camera 520 may include an infrared light 522 and a depth camera 524 (also referred to as an infrared light camera) configured to acquire video of a scene including one or more human subjects. The video may comprise a time-resolved sequence of images of spatial resolution and frame rate suitable for the purposes set forth herein. As described above with reference to FIGS. 1 and 2, the depth camera and/or a cooperating computing system (e.g., computing system 500) may be configured to process the acquired video to identify one or more postures and/or gestures of the user, determine a distance between the user and a display device, and to interpret such postures and/or gestures as device commands configured to control various aspects of computing system 500.

Depth camera 520 may include a communication module 526 configured to communicatively couple depth camera 520 with one or more other computing devices. Communication module 526 may include wired and/or wireless communication devices compatible with one or more different communication protocols. In one embodiment, the communication module 526 may include an imaging interface 528 to send imaging information (such as the acquired video) to computing system 500. Additionally or alternatively, the communication module 526 may include a control interface 530 to receive instructions from computing system 500. The control and imaging interfaces may be provided as separate interfaces, or they may be the same interface. In one example, control interface 530 and imaging interface 528 may include a universal serial bus.

The nature and number of cameras may differ in various depth cameras consistent with the scope of this disclosure. In general, one or more cameras may be configured to provide video from which a time-resolved sequence of three-dimensional depth maps is obtained via downstream processing. As used herein, the term 'depth map' refers to an array of pixels registered to corresponding regions of an imaged scene, with a depth value of each pixel indicating the depth of the surface imaged by that pixel. 'Depth' is defined as a coordinate parallel to the optical axis of the depth camera, which increases with increasing distance from the depth camera.

In some embodiments, depth camera 520 may include right and left stereoscopic cameras. Time-resolved images from both cameras may be registered to each other and combined to yield depth-resolved video.

In some embodiments, a "structured light" depth camera may be configured to project a structured infrared illumination comprising numerous, discrete features (e.g., lines or dots). A camera may be configured to image the structured illumination reflected from the scene. Based on the spacings between adjacent features in the various regions of the imaged scene, a depth map of the scene may be constructed.

In some embodiments, a "time-of-flight" depth camera may include a light source configured to project a pulsed infrared illumination onto a scene. Two cameras may be configured to detect the pulsed illumination reflected from the scene. The cameras may include an electronic shutter synchronized to the pulsed illumination, but the integration times for the cameras may differ, such that a pixel-resolved time-of-flight of the pulsed illumination, from the light source to the scene and then to the cameras, is discernible from the relative amounts of light received in corresponding pixels of the two cameras.

Depth camera 520 may include a visible light camera 532 (e.g., color). Time-resolved images from color and depth cameras may be registered to each other and combined to yield depth-resolved color video. Depth camera 520 and/or computing system 500 may further include one or more microphones 534.

While depth camera 520 and computing system 500 are depicted in FIG. 5 as being separate devices, in some embodiments depth camera 520 and computing system 500 may be included in a single device. Thus, depth camera 520 may optionally include computing system 500.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for adjusting a user interface display, comprising:
   receiving depth information of a physical space from a depth camera;
   locating a user within the physical space from the depth information;
   determining a distance between the user and a display device from the depth information;
   adjusting one or more features of a user interface displayed on the display device based on the distance; and
   scaling an input zone of the user based on the distance such that a size of a motion of a cursor displayed on the display device relative to a size of a gesture performed by the user in the input zone changes as a size of the input zone changes, the input zone comprising a cross-sectional area less than a field of view of the depth camera.

2. The method of claim 1, wherein adjusting one or more features further comprises adjusting a size of one or more features of the user interface displayed on the display device.

3. The method of claim 1, wherein adjusting one or more features further comprises adjusting a number of one or more features of the user interface displayed on the display device.

4. The method of claim 3, wherein as the distance decreases, the number of displayed features increases, and wherein as the distance increases, the number of displayed features decreases.

5. The method of claim 1, wherein adjusting one or more features of the user interface displayed on the display device based on the distance further comprises displaying the user interface with a first number of features when the distance is less than a first threshold, and displaying the user interface with a second number of features when the distance is greater than the first threshold.

6. The method of claim 5, further comprising continuing to display the user interface with the second number of features until the distance is below a second threshold, lower than the first threshold, and wherein once the distance is below the second threshold, displaying the user interface with the first number of features.

7. The method of claim 1, further comprising adjusting one or more features of the user interface based on a direction the user is facing.

8. On a computing device, a method for adjusting a user interface display, comprising:
receiving depth information of a physical space from a depth camera;
locating a user within the physical space from the depth information;
determining a distance between the user and a display device from the depth information;
if the user is a first distance from the display device, displaying a user interface on the display device with a first number of features;
as the user moves from the first distance to a second distance from the display device and thereby crosses a first threshold distance from the display device in a first direction, changing the user interface to display a second number of features that is different than the first number; and
as the user moves from the second distance toward the first distance and crosses the first threshold distance in a second direction, maintaining the user interface with the second number of features until a second threshold distance is crossed that is a different distance from the display device than the first threshold distance, and changing the user interface to display the first number of features upon crossing the second threshold distance.

9. The method of claim 8, wherein the first distance is less than the second distance, and wherein the first number of features is greater than the second number of features.

10. The method of claim 8, wherein the first distance is greater than the second distance, and wherein the first number of features is less than the second number of features.

11. The method of claim 8, further comprising if the user is the first distance from the display device, scaling an input zone of the user to a first size, and the user moves from the first distance to the second distance from the display device and thereby crosses the first threshold distance, scaling the input zone of the user to a second size, different than the first size.

12. The method of claim 11, wherein the input zone of the user comprises a zone of physical interaction between the user and the display device monitored by the depth camera, and further comprising, as the user moves from the second distance toward the first distance and crosses the first threshold distance in the second direction, maintaining the input zone of the user at the second size until the second threshold distance is crossed, and scaling the input zone of the user to the first size upon crossing the second threshold distance.

13. The method of claim 8, further comprising if the user is the first distance from the display device, receiving input from the user via touch input on the display device.

14. The method of claim 8, further comprising if the user is the second distance from the display device, receiving input from the user via gestures and/or voice commands.

15. A computing device, comprising:
a logic subsystem; and
a storage subsystem holding instructions executable by the logic subsystem to:
receive depth information of a physical space from a depth camera;
locate a user within the physical space from the depth information;
determine a distance between the user and a display device from the depth information;
adjust one or more features of a user interface displayed on the display device based on the distance by displaying control elements selectable by touch when the user is a first distance from the display device and displaying control elements selectable by gesture when the user is a second distance from the display device, the control elements selectable by touch different than the control elements selectable by gesture; and
scale an input zone of the user based on the distance, the input zone comprising a cross-sectional area less than a field of view of the depth camera.

16. The computing device of claim 15, wherein the instructions are executable to scale the input zone of the user based on a size of the user determined from the depth information.

17. The computing device of claim 15, wherein the instructions are executable to scale the input zone of the user based on the distance by increasing a size of the input zone as the distance increases.

18. The computing device of claim 15, wherein the instructions are executable to adjust the one or more features upon detecting that a user moved across a threshold distance.

19. The computing device of claim 15, wherein the instructions are executable to adjust the one or more features by adjusting a size and/or number of one or more features of the user interface displayed on the display device.

* * * * *